US008649180B2

(12) United States Patent
Grady et al.

(10) Patent No.: US 8,649,180 B2
(45) Date of Patent: Feb. 11, 2014

(54) SYSTEM AND METHOD FOR TOOL-LESS MOUNTING OF A BEZEL WITH AN ELECTRONIC DEVICE

(75) Inventors: John R. Grady, Cypress, TX (US); John P. Franz, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1488 days.

(21) Appl. No.: 11/656,170

(22) Filed: Jan. 22, 2007

(65) Prior Publication Data

US 2007/0279858 A1 Dec. 6, 2007

Related U.S. Application Data

(60) Provisional application No. 60/809,443, filed on May 30, 2006.

(51) Int. Cl.
G06F 1/16 (2006.01)

(52) U.S. Cl.
USPC .......................................... 361/725

(58) Field of Classification Search
USPC .............. 361/683, 725, 726, 679.02, 679.33, 361/748, 752, 759, 784, 785, 788, 796, 797, 361/801, 802
See application file for complete search history.

(56) References Cited

U.S. PATENT DOCUMENTS

| 5,369,645 | A | 11/1994 | Pritchard et al. |
| 5,764,254 | A | 6/1998 | Nicoloff et al. |
| 5,971,524 | A | 10/1999 | Nicoloff et al. |
| 6,025,989 | A * | 2/2000 | Ayd et al. ........................ 361/727 |
| 6,359,778 | B1 * | 3/2002 | Wu ................................ 361/683 |
| D473,562 | S | 4/2003 | Russell |
| D473,563 | S | 4/2003 | Russell et al. |
| 6,643,139 | B2 * | 11/2003 | Tien .............................. 361/726 |
| 6,648,149 | B2 * | 11/2003 | Robertson ..................... 361/801 |
| 6,666,340 | B2 | 12/2003 | Basinger et al. |
| 6,669,497 | B2 * | 12/2003 | Westphall et al. ............ 439/325 |
| 6,724,628 | B2 | 4/2004 | Franz et al. |
| 6,754,084 | B1 | 6/2004 | Bolognia et al. |
| 6,829,146 | B2 | 12/2004 | Franz et al. |
| 6,858,792 | B2 | 2/2005 | Franz et al. |
| 6,891,728 | B1 * | 5/2005 | Mease et al. .................. 361/724 |
| 6,914,778 | B2 * | 7/2005 | Deckers et al. ............... 361/685 |
| 6,921,282 | B2 * | 7/2005 | Chiou et al. .................. 439/483 |
| 6,957,291 | B2 * | 10/2005 | Moon et al. ................. 361/679.4 |
| 6,978,903 | B2 * | 12/2005 | Son et al. ........................ 211/26 |
| 6,987,672 | B2 | 1/2006 | Franz et al. |
| 7,023,703 | B2 * | 4/2006 | Peloza ........................... 361/727 |
| 7,026,551 | B2 | 4/2006 | Franz et al. |
| 7,027,309 | B2 | 4/2006 | Franz et al. |
| 7,035,096 | B2 | 4/2006 | Franz et al. |
| 7,054,160 | B2 * | 5/2006 | Kim .............................. 361/754 |
| 7,200,004 | B2 * | 4/2007 | Chen et al. ............... 361/679.39 |
| 7,251,132 | B1 * | 7/2007 | Paul et al. ................. 361/679.33 |
| 7,301,778 | B1 * | 11/2007 | Fang ............................. 361/726 |
| 7,369,403 | B2 * | 5/2008 | Chen et al. .................... 361/683 |
| 7,375,960 | B2 * | 5/2008 | Blaalid et al. ............ 361/679.33 |
| 7,570,487 | B2 * | 8/2009 | Clark et al. .................... 361/787 |

(Continued)

Primary Examiner — Adrian S Wilson

(57) ABSTRACT

Embodiments of the present invention are directed to a blade server and blade server components. Specifically, one embodiment is directed to a server comprising a server chassis, a system board coupled to the server chassis, the system board comprising a first electrical connector, and a bezel assembly coupled to the server chassis and the system board, the bezel assembly comprising a printed circuit assembly comprising a second electrical connector communicatively mated to the first electrical connector.

26 Claims, 15 Drawing Sheets

(56) References Cited

U.S. PATENT DOCUMENTS

| | | |
|---|---|---|
| 2002/0067592 A1* | 6/2002 | Horiuchi et al. ............. 361/685 |
| 2002/0104396 A1* | 8/2002 | Megason et al. ................ 74/109 |
| 2002/0181197 A1* | 12/2002 | Huang ......................... 361/685 |
| 2003/0026069 A1* | 2/2003 | Jiang ............................ 361/683 |
| 2004/0017663 A1* | 1/2004 | Yen et al. ..................... 361/727 |
| 2004/0100765 A1* | 5/2004 | Crippen et al. .............. 361/687 |
| 2004/0174681 A1 | 9/2004 | Franz et al. |
| 2005/0078452 A1 | 4/2005 | Franz et al. |
| 2005/0083670 A1* | 4/2005 | Peloza .......................... 361/801 |
| 2005/0117282 A1* | 6/2005 | Shtargot et al. ............... 361/679 |
| 2005/0157464 A1* | 7/2005 | McAlister ..................... 361/685 |
| 2005/0162837 A1* | 7/2005 | Kim ............................... 361/725 |
| 2005/0190535 A1* | 9/2005 | Peng et al. .................... 361/685 |
| 2005/0257232 A1* | 11/2005 | Hidaka .......................... 361/685 |
| 2006/0050487 A1* | 3/2006 | Wu et al. ....................... 361/724 |
| 2006/0221579 A1* | 10/2006 | Liang et al. ................... 361/724 |
| 2006/0250766 A1* | 11/2006 | Blaalid et al. ................. 361/685 |
| 2007/0064385 A1* | 3/2007 | Paul et al. ..................... 361/685 |
| 2007/0163108 A1* | 7/2007 | Dingfelder et al. ............. 29/762 |
| 2008/0025000 A1* | 1/2008 | Huang et al. .................. 361/726 |

* cited by examiner

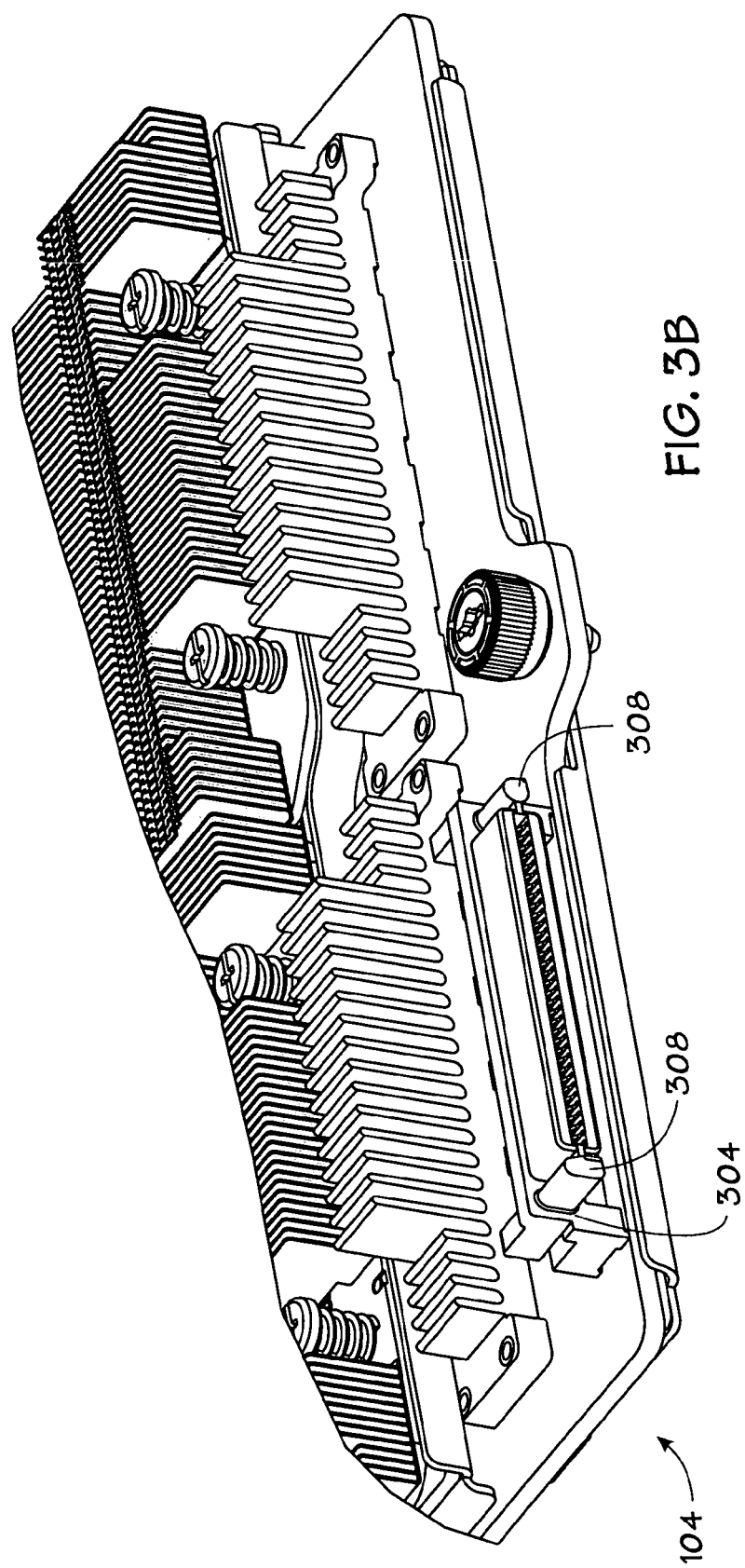

SYSTEM AND METHOD FOR TOOL-LESS MOUNTING OF A BEZEL WITH AN ELECTRONIC DEVICE

This application claims the benefit of U.S. Provisional Application No. 60/809,443, filed May 30, 2006.

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

A typical blade server system may include a blade enclosure or housing for a number of individual minimally-packaged computer motherboards. These computer motherboards may be referred to as blade servers or simply "blades." Blade servers may generally be described as self-contained computer servers designed for high density arrangement within a blade enclosure. For example, densities of more than one-hundred computers per blade enclosure may be achieved with blade server systems. Each blade in a typical blade server system is generally arranged within a blade enclosure of the system and typically includes one or more processors, memories, network connections, and so forth. However, while there are general similarities between typical blade servers, it should be noted that different types of blade servers may have different configurations and may include different components to address various operational and spatial efficiency issues. For example, some blade servers may have components removed to accommodate space limitations while still including the functional components of a computer. Other blade servers may include additional components to address certain functional issues. As more features are included in blade servers and less space is allotted for the features, it becomes more desirable to reduce complexity and improve serviceability of such blade servers. In addition, existing systems typically include cables between components, thereby making the internal space cluttered and difficult to service.

BRIEF DESCRIPTION OF THE DRAWINGS

FIG. 3A and FIG. 3B are perspective views of connectors disposed on both a bezel PCA and a blade system board in accordance with an exemplary embodiment of the present invention;

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention are directed to a system configured for tool-lessly mounting a bezel assembly in a blade server. The bezel assembly includes a bezel printed circuit assembly (PCA) that is configured to communicatively couple to a system board (e.g., a motherboard or a circuit board with a central processing unit and/or random access memory) of the blade server to enable cooperative functioning of the bezel PCA and the blade server. For example, the bezel PCA may be powered by the system board via a communicative coupling with the system board, and the bezel PCA may provide functionality to the blade server. This coupling of the two components is achieved in accordance with present embodiments with electrical connectors (e.g., male and female blind mate connectors) that are respectively disposed on the bezel assembly and the system board. By using these connectors, present embodiments may avoid the use of a cable link and the use of tools when communicatively coupling the bezel PCA and the system board. Additionally, a bezel lock and corresponding tabs may be disposed in alternate locations on the bezel assembly and the system board (or a chassis coupled to the system board) to facilitate securing and decoupling of the bezel assembly and the system board. Present embodiments efficiently utilize available space in the blade server by eliminating the use of unnecessary connection components (e.g., electrical cables) and provide a simplified coupling mechanism that can be utilized to assemble and readily gain access to server components.

Figure 1:
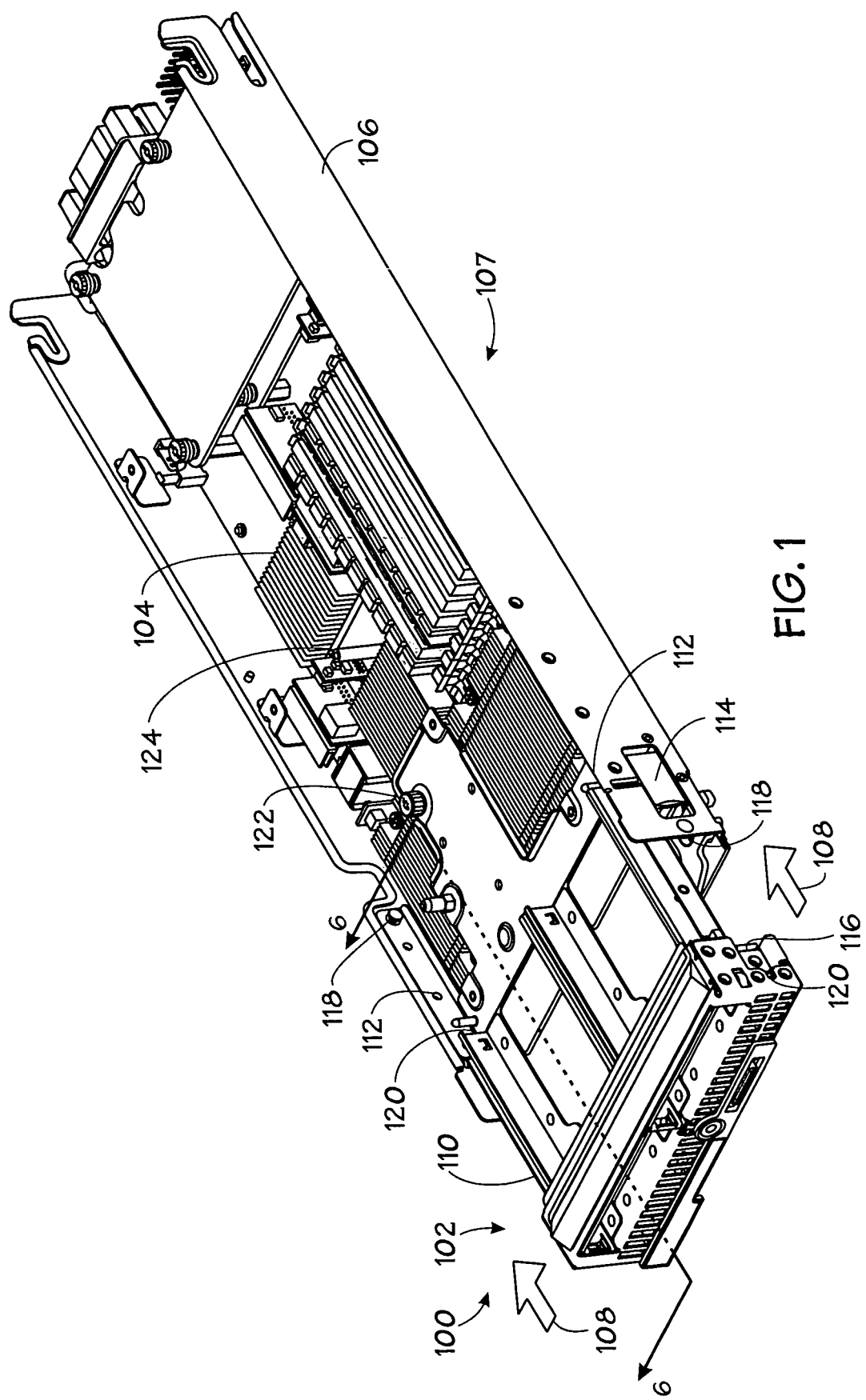
FIG. 1 is a perspective view of a blade server in accordance with an exemplary embodiment of the present invention.

FIG. 1 is a perspective view of a blade server 100 in accordance with an exemplary embodiment of the present invention. The blade server 100 has three major components, which include a bezel assembly 102, a blade system board 104, and a blade server chassis 106. In other embodiments, the blade server 100 may include various different components. The illustrated bezel assembly 102 is a frontal component of the blade server 100 that may act as a face plate for the server 100. The bezel assembly 102 may provide readily accessible diagnostic features and control features, such as diagnostic light emitting diodes (LEDs), a liquid crystal display (LCD), ports, and power switches, and may include related circuitry. In one embodiment, the blade system board 104 is a motherboard and is the central component of the blade server 100. In other embodiments, the blade system board 104 may include various electronic components, such as a basic circuit board. The blade server chassis 106 includes a housing that couples to the blade system board 104 to provide protection and to facilitate insertion of the blade server 100 into a blade enclosure (e.g., a server cabinet or rack).

The blade system board 104 is already coupled to the blade server chassis 106 in the embodiment illustrated by FIG. 1. The combined blade system board 104 and blade server chassis 106 may be referred to as a server assembly 107. In contrast to these already combined blade server components, the bezel assembly 102 is shown in the process of being coupled to the blade system board 104 and the blade server chassis 106, as indicated by arrows 108. To facilitate this coupling, guides 110 on the bezel assembly 102 are configured to slide along bezel guide rails 112 (e.g., two sheet metal bezel guide rails) of the blade server chassis 106 into a coupled configuration with the blade system board 104 and the blade server chassis 106. In other embodiments, a different coupling mechanism may be utilized. These bezel guide rails 112 help support and position the bezel assembly 102 properly. Further, a pair of latches 114 (e.g., spring loaded, quick release latches) on the blade server chassis 106 are configured to receive retention flanges 116 extending from the bezel assembly 102 to secure the components of the blade server 100 in the coupled configuration. The latches 114 may also be configured to bias the bezel assembly 102 out of a coupling with the other components of the blade server 100 when actuated. Additionally, various spools 118, spool receptacles 120, hand-screws 122, and screw receptacles 124 are configured to engage one another to provide stability (e.g., resist movement and/or absorb shock of blade server components when shocks and vibrations occur) in the coupled configuration. In other embodiments, different retention features may be utilized to secure the blade server chassis 106 and the bezel assembly 102. Further, while the illustrated embodiment is configured to be placed adjacent another blade server 100 or a wall of a blade assembly, in some embodiments, a lid may be installed to cover the blade server 100.

Figure 2:
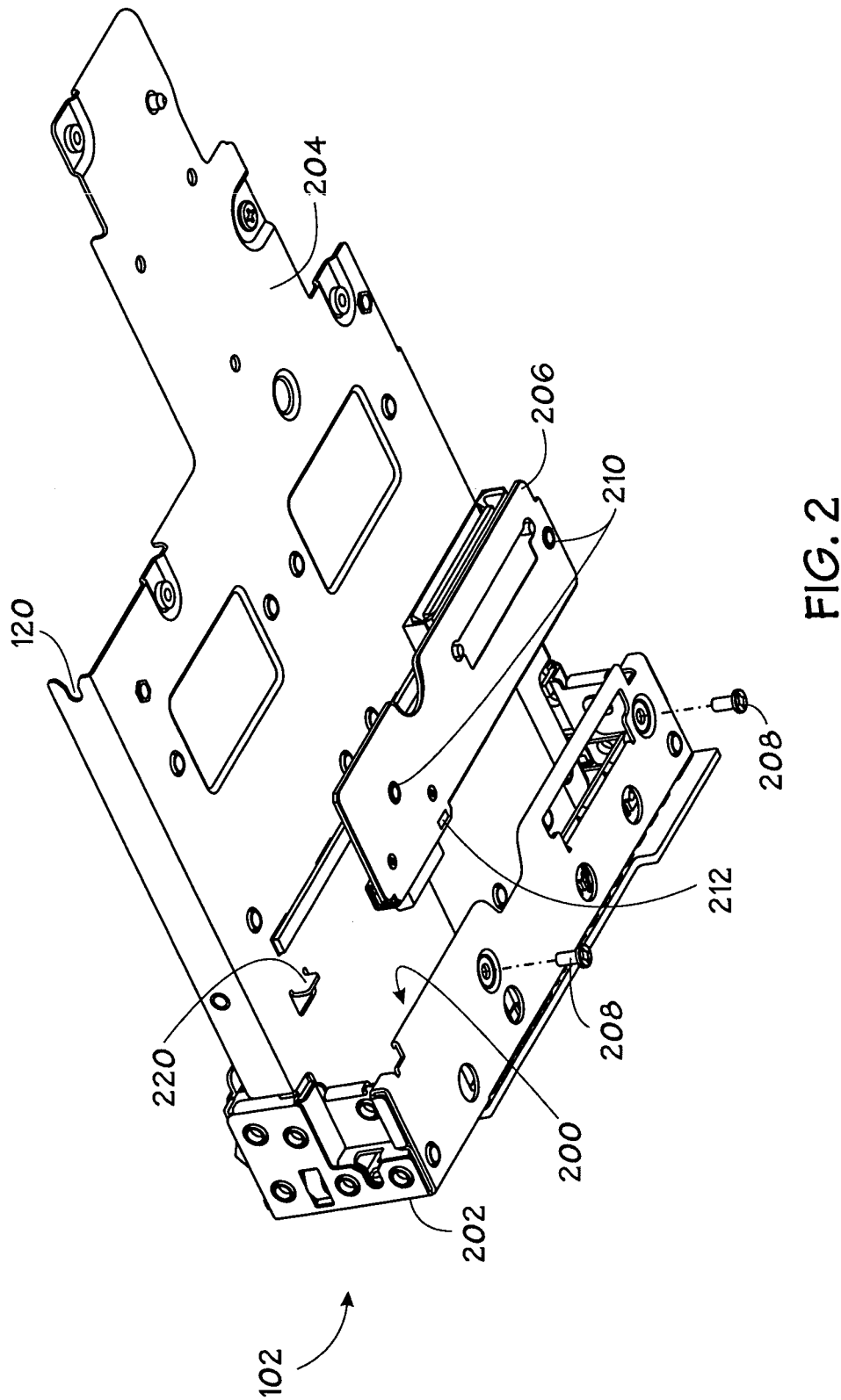
FIG. 2 is an exploded perspective view of a bezel assembly for a blade server in accordance with an exemplary embodiment of the present invention.

FIG. 2 is an exploded perspective view of the bezel assembly 102 in accordance with an exemplary embodiment of the present invention. Specifically, FIG. 2 illustrates a view of the bezel assembly 102 from the perspective of the blade system board 100 in FIG. 1. This perspective allows a view into a cavity 200 formed within a front portion of the bezel assembly 102. As set forth above, the bezel assembly 102 may act as a face plate for the blade server 100. In other words, the bezel assembly 102 may act as a user access point or interface for certain server features during operation. The bezel assembly 102 may be a desirable access point because the other blade server components (e.g., the blade system board 104 and the blade server chassis 106) are typically hidden away within a blade enclosure during operation and are thus inaccessible to the user. As illustrated in FIG. 2, the bezel assembly 102 includes a bezel face 202, a bezel body 204, and a bezel printed circuit assembly (PCA) 206 (e.g., an LED/Power Switch PCA). The bezel face 202 may be described as the actual viewable feature of the blade server 100 during operation and may include or facilitate access to various LEDs, switches, ports, alphanumeric keys (e.g., a keypad or keyboard), and/or a display (e.g., LCD). In the illustrated embodiment, the bezel face 202 couples to the bezel body 204, which is a generally planar component that facilitates coupling of the bezel assembly 102 to other components of the blade server 100. The bezel face 202 and the bezel body 204 may be formed from sheet metal and may include various plastic components. The bezel PCA 206 may couple to either the bezel face 202 or the bezel body 204. In the illustrated embodiment, the PCA 206 is assembled to the bezel face 202 for retention purposes with two machine screws 208 that pass through the bezel face 202 and into threaded inserts 210 in the bezel PCA 206. The bezel body 204 also includes an ejector tab 220 to facilitate disconnecting the bezel assembly 102 from the blade system board 104.

The bezel PCA 206 may interact with the blade system board 104 to provide the blade server 100 with a desired functionality. For example, the bezel PCA 206 may facilitate operation of various diagnostic LEDs and controls (e.g., power switching). While inclusion of the separate bezel PCA 206 in the blade server 100 could be avoided by including its functionality (e.g., diagnostic LEDs and power switching) on the blade system board 104, it may be desirable to keep these features separate from the blade system board 104 for efficiency purposes. For example, if all of the features of both the bezel PCA 206 and the blade system board 104 were resident on the blade system board 104, in the event that an uncorrectable issue arose with respect to any of the features, the entire blade system board 104 may require replacement. Having to replace an entire blade system board 104 because of an issue with diagnostic LEDs or power switching, for example, could be disproportionately costly. Also, separation of the bezel PCA 206 and the system board 104 may facilitate use of the bezel PCA 206 with multiple blade server platforms, which may improve manufacturing efficiency and provide costs savings. Additionally, in some embodiments, the bezel PCA 206 may include an ambient temperature sensor 212. This may facilitate measurement of a true ambient temperature entering the blade server 100. If such a sensor were placed on the system board 104, it would be subject to heat generating sources on the system board 104, which would likely result in inaccurate ambient temperature measurements.

In accordance with some embodiments, including the bezel PCA 206 as a component of the bezel assembly 102 makes the bezel PCA 206 removable with the bezel assembly 102 and positions the bezel PCA 206 proximate the accessible portion of the blade server 100. Various benefits may arise from this. For example, available space in the server 100 may be efficiently utilized by including the bezel PCA 206 in the bezel assembly 102. Specifically, space in the server 100 may be saved by placing the bezel PCA 206 near diagnostic and/or control features (e.g., LEDs) on or near the bezel face 202. Indeed, because communication with the bezel PCA 206 is performed for operation of such features, placing the bezel PCA 206 proximate the bezel face 202 may reduce the space consumption of communication lines (e.g., cables) between the features and a more remote location of the bezel PCA 206. Additionally, inclusion of the bezel PCA 206 in the bezel assembly 102 may reduce the complexity of the blade server 100, increase accessibility to server components, and improve serviceability of the blade server 100. For example, if the bezel PCA 206 is subject to replacement or removal to provide access to other server components, it can be readily removed by decoupling the bezel assembly 102 from the server assembly 107. Additionally, the bezel PCA 206 can be coupled to the blade system board 104 (e.g., for cooperative operations) by simply sliding the bezel assembly 102 into a coupled configuration with the blade system board 104. In other words, in the illustrated embodiment, the bezel PCA 206 and the blade system board 104 can directly mate with one another without an intermediate cable.

Figure 3A:
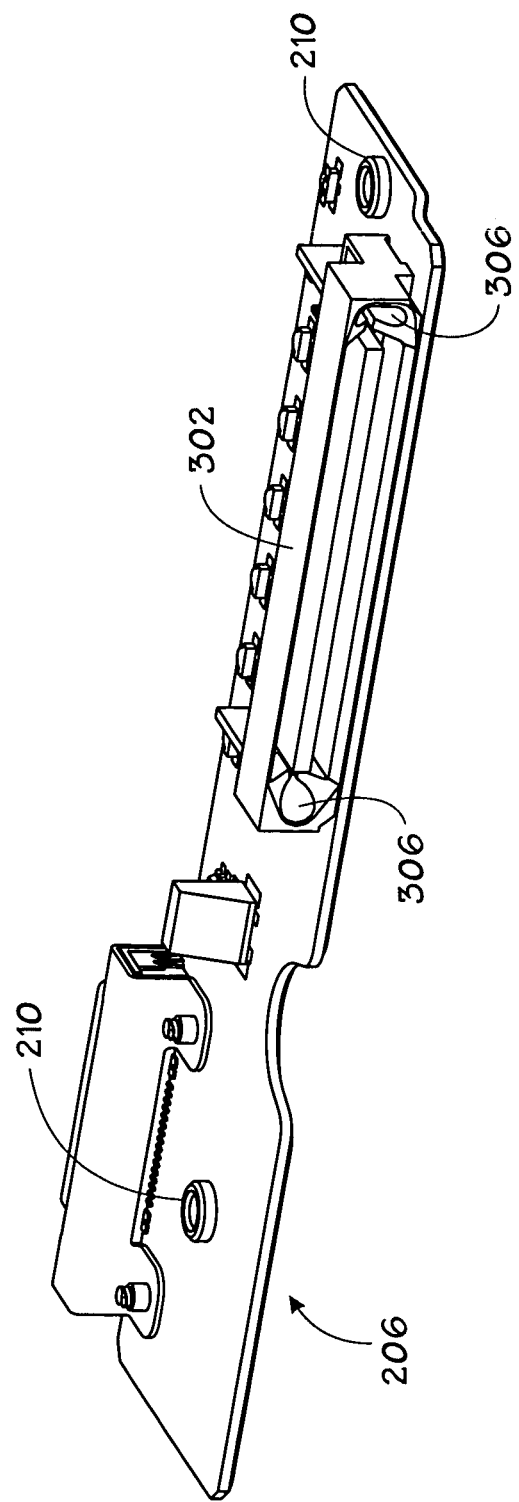

FIGS. 3A and 3B are perspective views of connectors disposed on both the bezel PCA 206 and the blade system board 104 in accordance with an exemplary embodiment of the present invention. As set forth above, the bezel PCA 206 may be coupled with the blade system board 104 in order to function cooperatively with the board 104. Accordingly, in the illustrated embodiment, the bezel PCA 206 includes a bezel connector 302 that is configured to couple with a system board connector 304 on the blade system board 104 to provide a communicative coupling (e.g., electrical communication) between the two blade server components 104 and 206. In the illustrated embodiment, the bezel connector 302 is a blind mate female connector and the system board connector 304 is a blind mate male connector. In other words, the bezel connector 302 includes guide receptacles 306 and the system board connector 304 includes guide pins 308 configured to engage the guide receptacles 306. The use of blind mate connectors may ensure that the connectors 302 and 304 will line up properly to prevent connector damage during installation. The guides 110 and bezel guide rails 112 may facilitate this connection. In other embodiments, the connector types may be switched between the blade server components 104 and 206 or altogether different connector types may be employed. The connectors 302 and 304 may enable automatic connection and disconnection of the system board 104 and the bezel PCA 206 when the bezel assembly 102 engages and disengages the chassis 106, respectively.

The two connectors 302 and 304 may facilitate automatic coupling of the bezel PCA 206 with the blade system board 104 when the bezel assembly 102 is coupled to the blade system board 104. In other words, in the process of coupling the bezel assembly 102 with the other blade server components to assemble the blade server 100, the two connectors 302 and 304 may be forced into a directly mated configuration. Even when a user cannot observe the two connectors 302 and 304, the guide receptacles 306 and the guide pins 308 are configured for alignment to facilitate coupling of the two connectors 302 and 304. For example, when the guides 110 on the bezel assembly 102 are in position to slide along the bezel guide rails 112, the guide receptacles 306 and guide pins 308 may be aligned such that the pins 308 may be received by the receptacles 306 as the bezel assembly 102 is pushed together with the blade system board 104. Once the guide pins 308 are in the guide receptacles 306, the guide pins 308 may then follow the guide receptacles 308 and force the bezel connector 302 into alignment with the system board connector 304. This facilitates proper mating of the two connectors 302 and 304 as the blade server components are pushed together or coupled to form the blade server 100.

Figure 4:
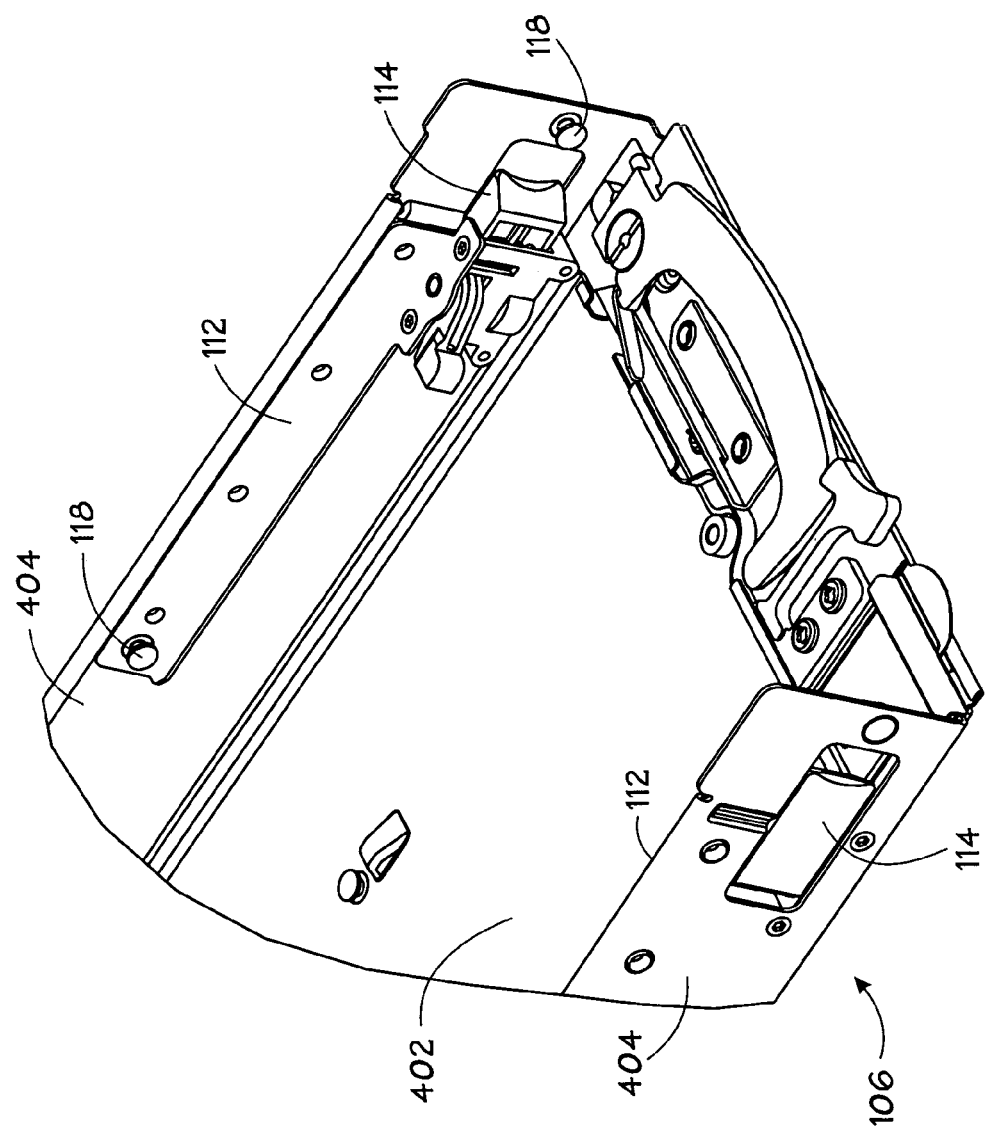
FIG. 4 is a perspective view of a front portion of a blade server chassis that is configured to receive the bezel assembly in accordance with an exemplary embodiment of the present invention.

FIG. 4 is a perspective view of a front portion of the blade server chassis 106 that is configured to receive the bezel assembly 102 in accordance with an exemplary embodiment of the present invention. In the illustrated embodiment, the blade server chassis 106 includes a base plane 402 and two side walls 404 extending substantially perpendicularly from the base plane 402. Each of the two side walls 404 is coupled to one of the bezel guide rails 112. As set forth above with respect to FIG. 1, the bezel guide rails 112 are configured to receive the guides 110 on the bezel assembly 102 to facilitate coupling the bezel assembly 102 with the blade system board 104 and the blade server chassis 106. The two side walls 404 are also coupled to a set of mounting spools 118 (e.g., flanged cylinders) that are positioned to align and mate with the spool receptacles 120 on the bezel assembly 102. These spools 118 and spool receptacles 120 may be configured to hold the bezel assembly 102 in a stable position with respect to the blade system board 104 and the blade server chassis 106 when these components are coupled together. Specifically, in the illustrated embodiment, when the spools 118 and the spool receptacles 120 are interlocked, they may prevent movement in a direction perpendicular to the direction in which the bezel assembly 102 slides into the blade server chassis 106. The blade server chassis 106 also includes the latches 114, which are disposed on each of the side walls 404 via the bezel guide rails 112 in the illustrated embodiment. The latches 114 may facilitate securing and ejecting the bezel assembly 102.

Figure 5:
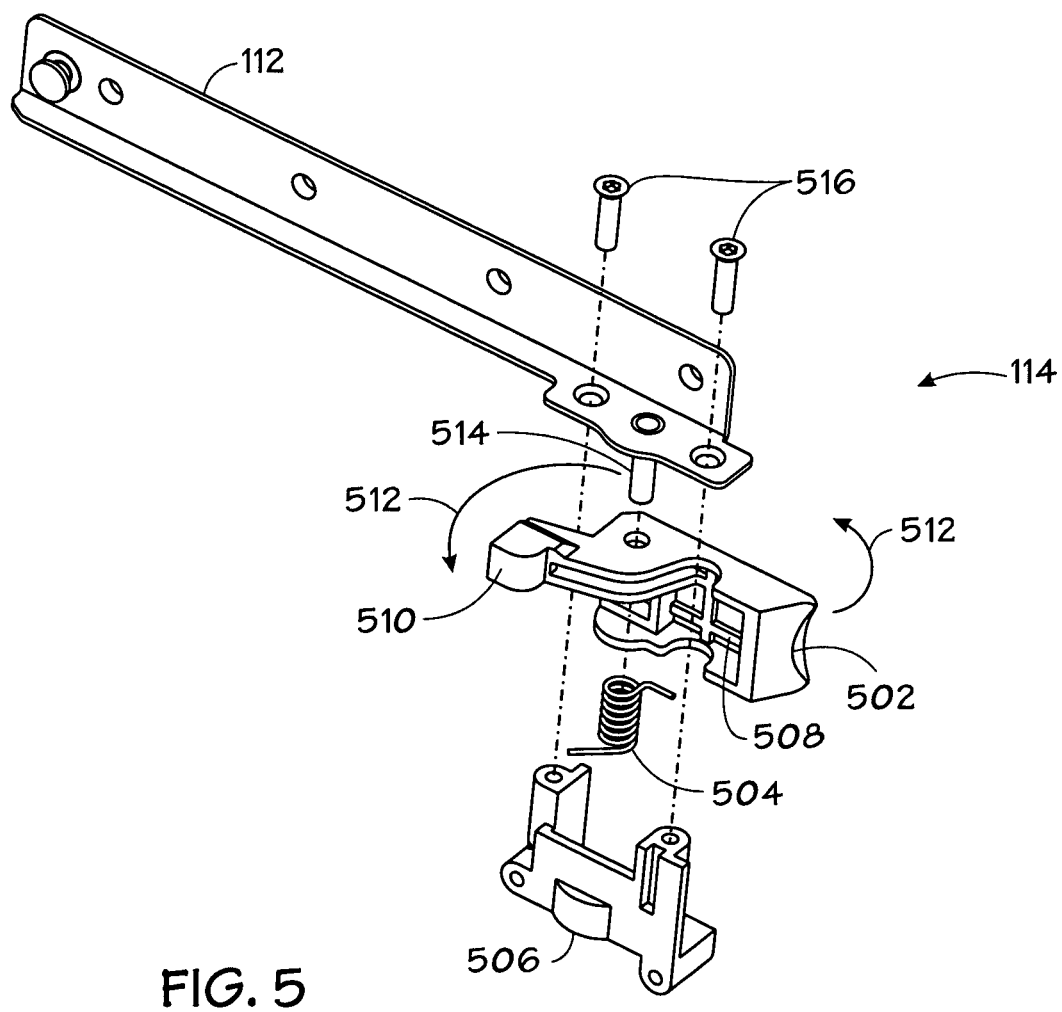
FIG. 5 is an exploded perspective view of a latch, which is coupled to a bezel guide rail, in accordance with an exemplary embodiment of the present invention.

FIG. 5 is an exploded perspective view of one of the latches 114, which is coupled to one of the bezel guide rails 112 in accordance with an exemplary embodiment of the present invention. As illustrated in FIG. 5, the latch includes a bezel lock 502, a spring 504, and a bezel lock housing 506. The bezel lock 502 includes a retention feature 508 and an ejector feature 510. As discussed in further detail below, the retention feature 508 and the ejector feature 510 may coordinate with features (e.g., tabs) on the bezel assembly 102 to secure the bezel assembly 102 in a coupled configuration with the other blade server components and eject it from that configuration. The bezel lock 502 is arranged between the bezel guide rail 112 and the bezel lock housing 506 such that the bezel lock 502 can rotate, as indicated by arrows 512. Specifically, the bezel lock 502 is configured to rotate about an assembly pin 514 that extends from the bezel guide rail 112 towards the bezel lock housing 506. The bezel lock housing 506 and the bezel guide rail 112 are coupled together via a pair of screws 516 (e.g., plastite assembly screws), which are configured to pass through the bezel guide rail 112, around the bezel lock 502, and into the bezel lock housing 506. When the latch 114 is assembled, the screws 516 may limit the range of its rotation about the assembly pin 514. The spring 504 may bias the bezel lock into a closed position, wherein the bezel lock is substantially parallel with the guide rail 112 and the side wall 404. Accordingly, as the bezel assembly 102 is slid into a coupled configuration with the blade server chassis 106 and the blade system board 104, the bezel lock 502 may be biased outward by the retention flange 116 on the bezel assembly 102 and then the spring 504 may cause it to snap back over the retention flange 116 when the bezel assembly 102, the blade system board 104, and the blade server chassis 106 are in an assembled configuration.

Figure 6:
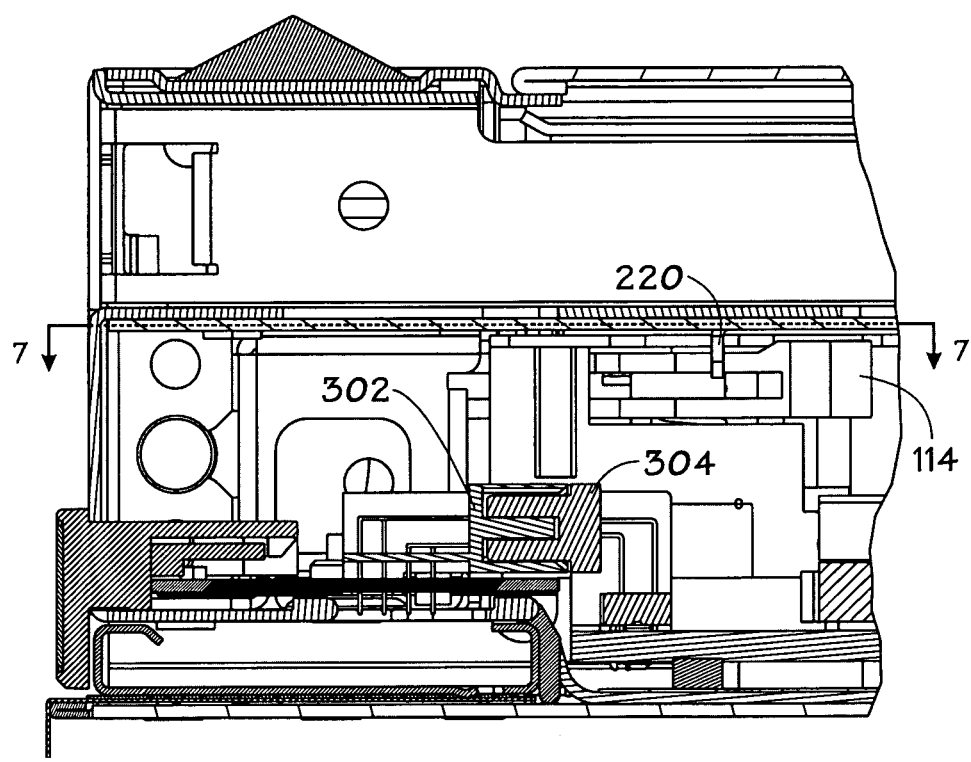
FIG. 6 is a cross-sectional view taken generally along the line 6-6 in FIG. 1 when the bezel assembly is fully coupled to the blade system board and the blade server chassis in accordance with an exemplary embodiment of the present invention.
Figure 7A:
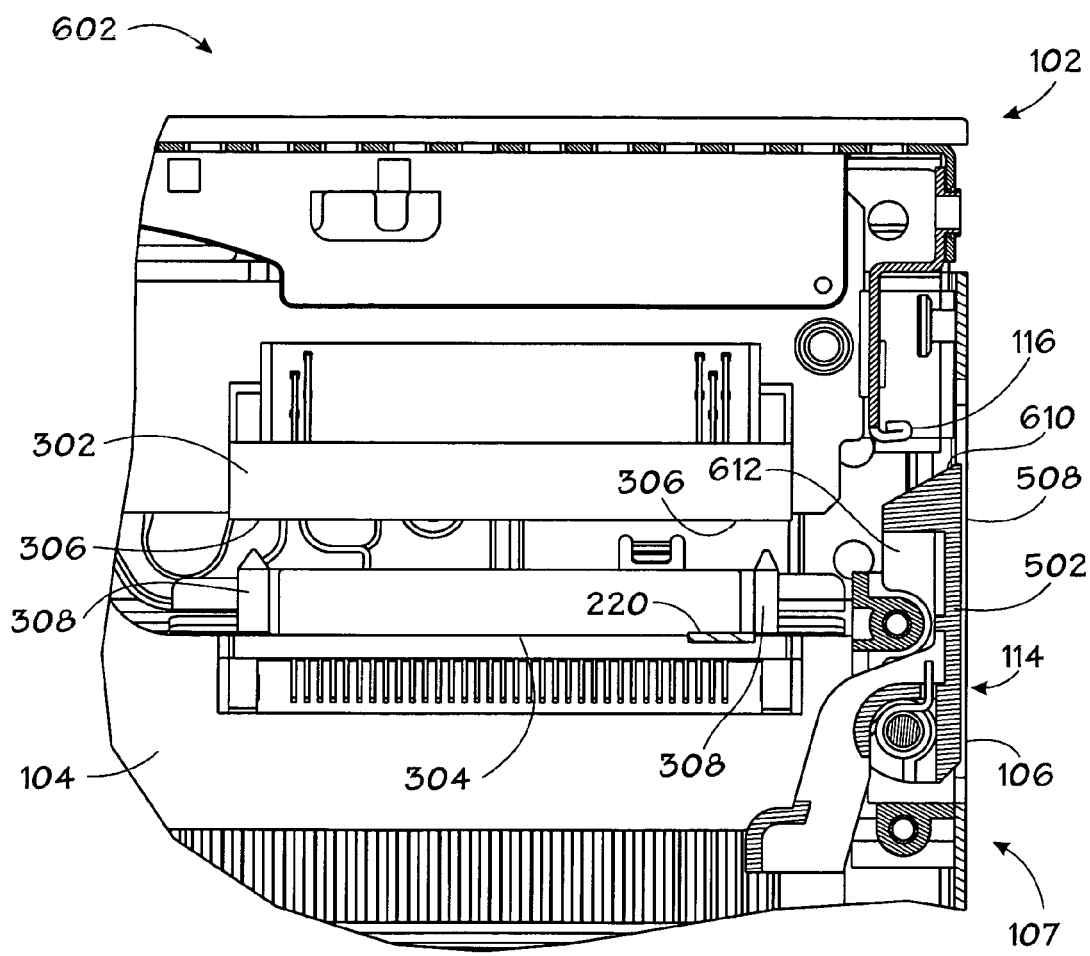
FIG. 7A, FIG. 7B, FIG. 7C, and FIG. 7D are a series of four plan views taken generally along line 7-7 in FIG. 6 that represent different stages in a process of coupling the bezel assembly with the server assembly in accordance with an exemplary embodiment of the present invention.
Figure 7B:
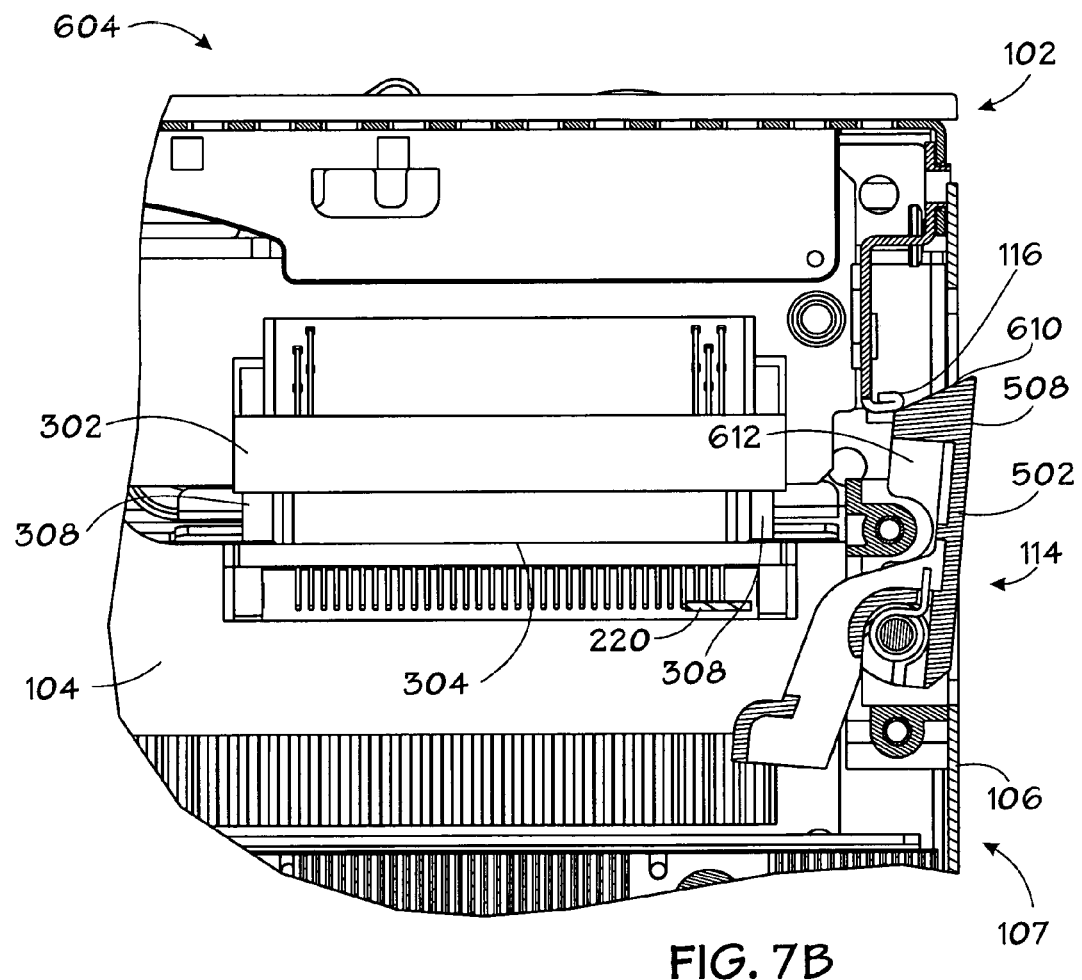
Figure 7C:
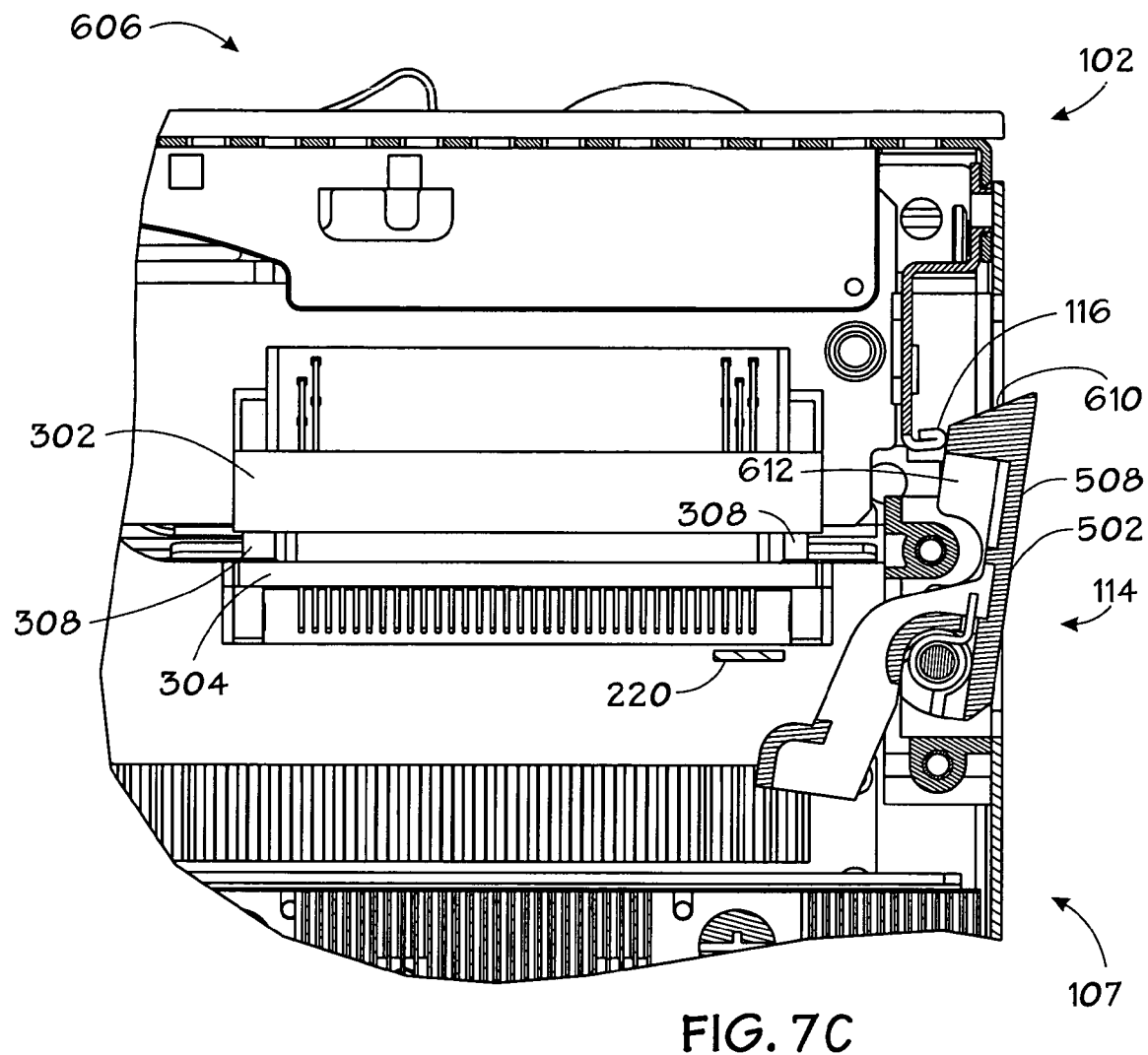
Figure 7D:
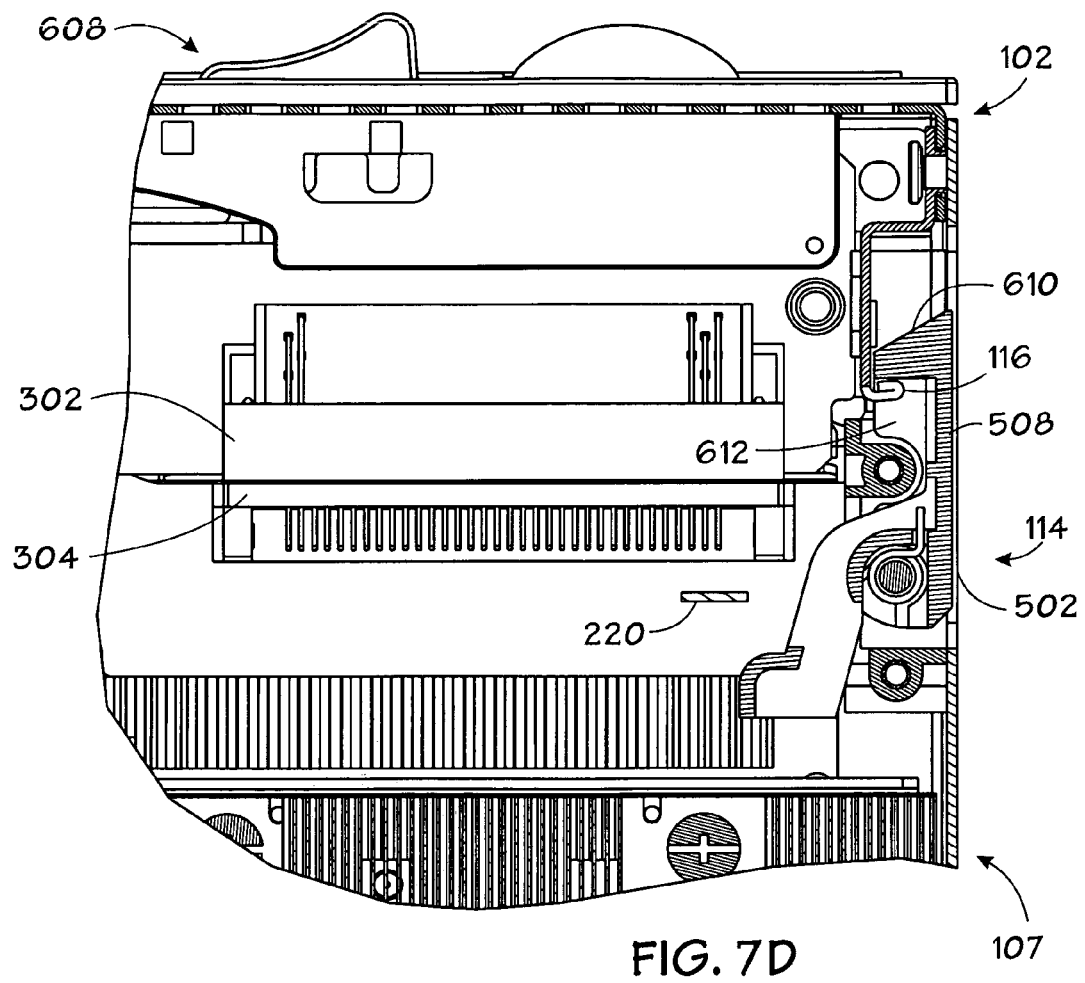
Figure 8A:
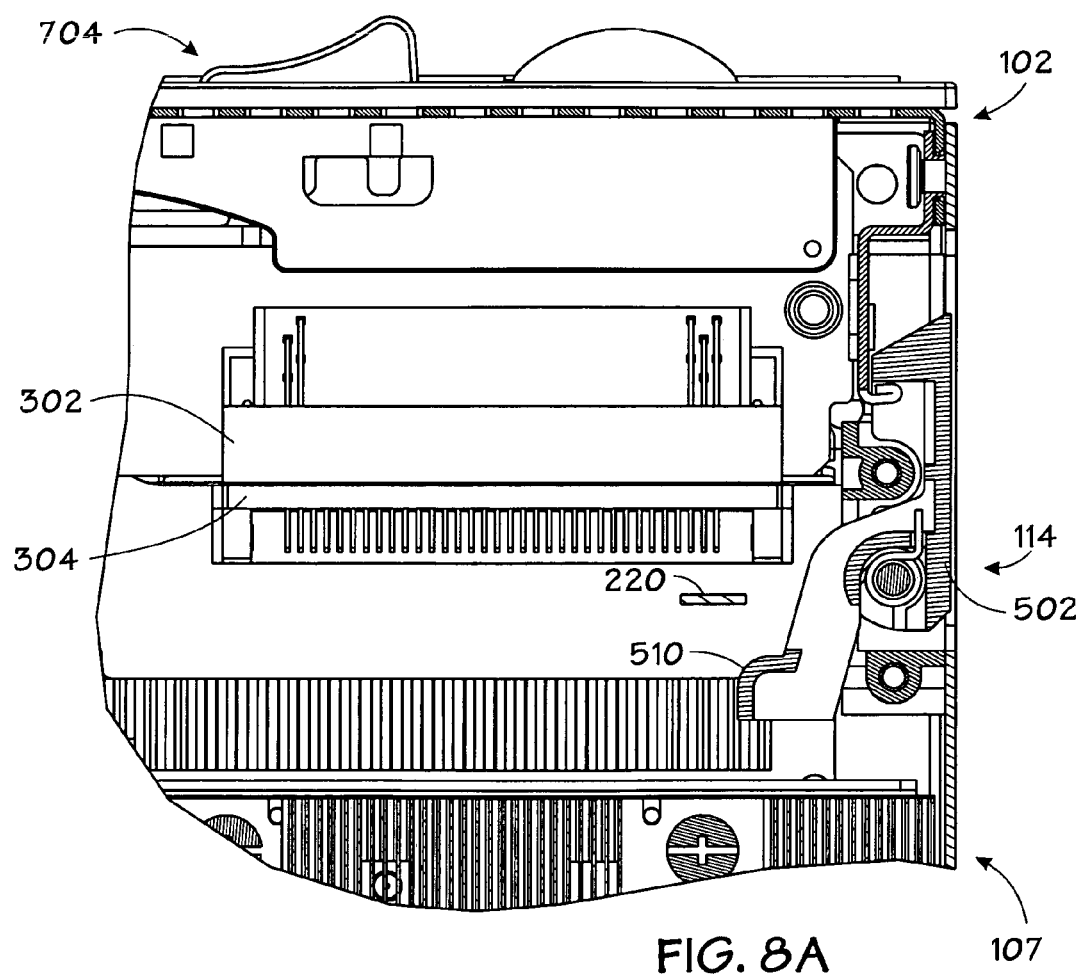
FIG. 8A, FIG. 8B, FIG. 8C, and FIG. 8D are a series of four plan views taken generally along line 7-7 in FIG. 6 that represent different stages in a process of decoupling the bezel assembly from the server assembly in accordance with an exemplary embodiment of the present invention.
Figure 8B:
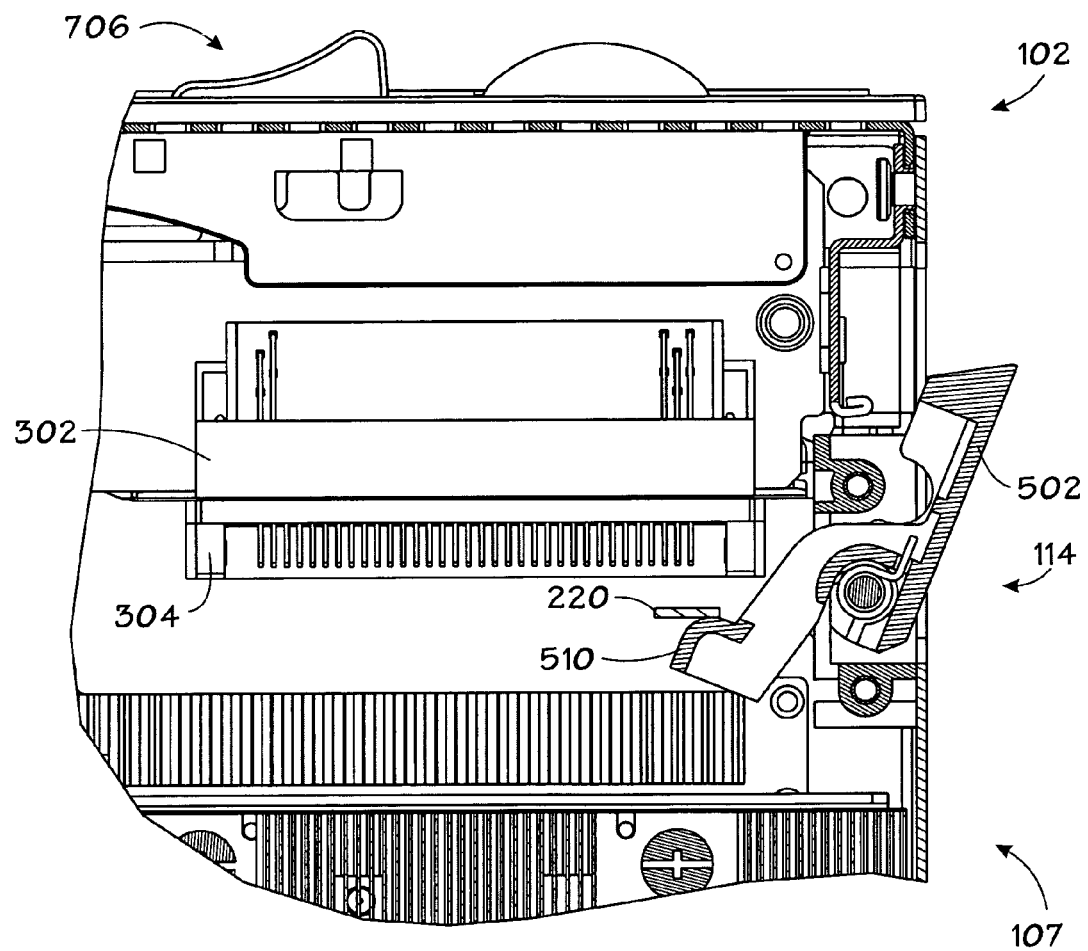
Figure 8C:
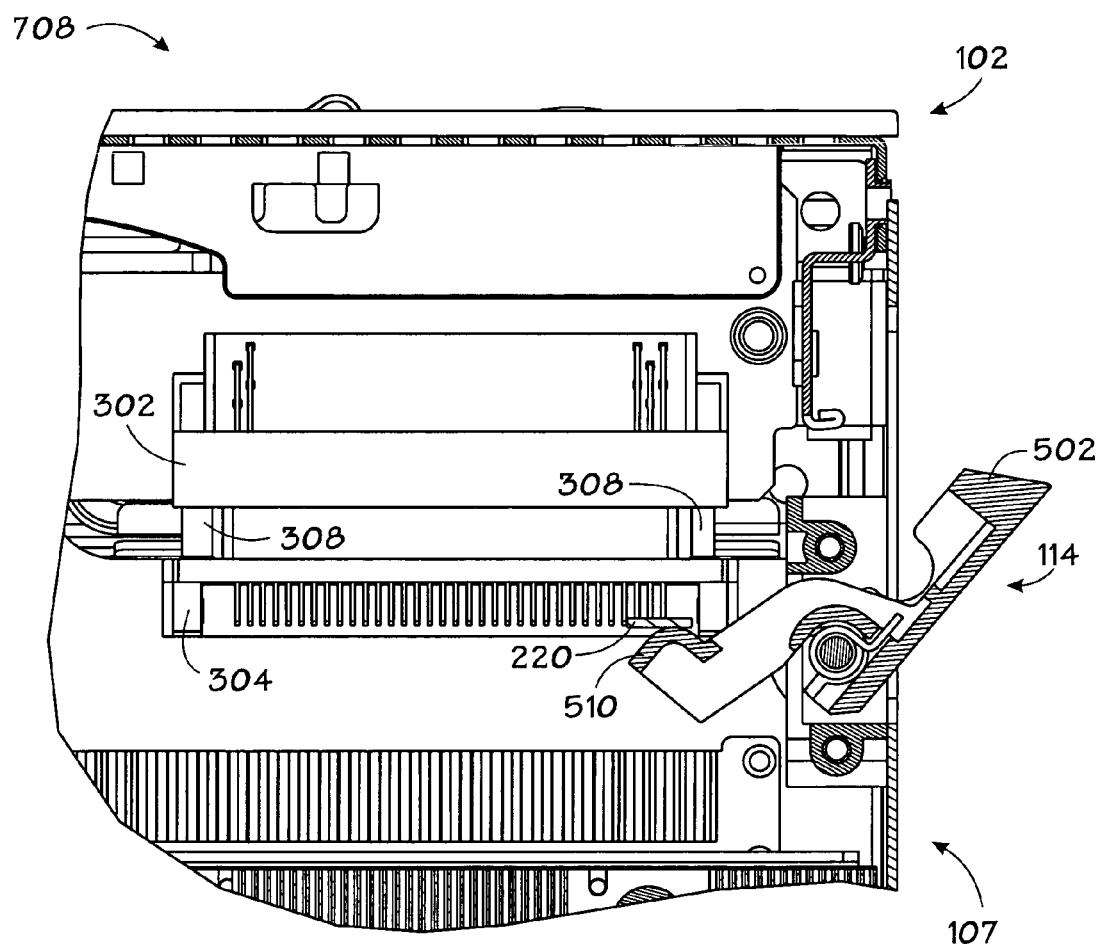
Figure 8D:
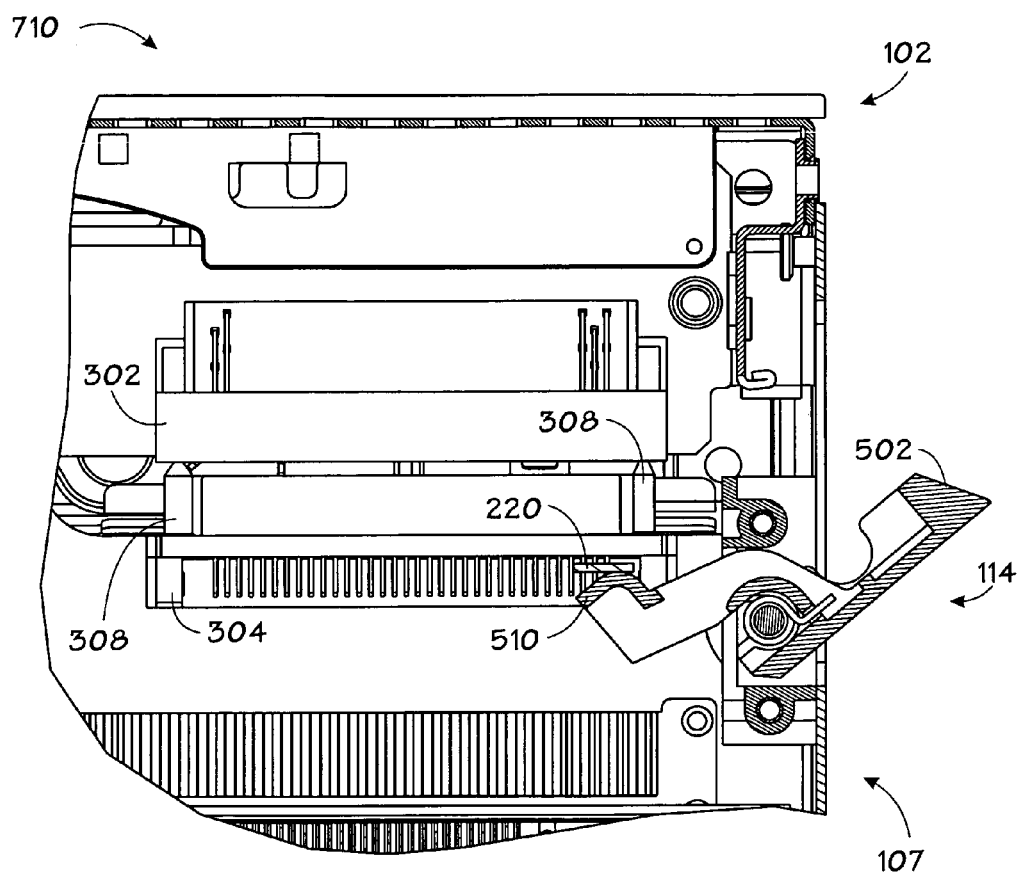

FIG. 6 is a cross-sectional view taken generally along the line 6-6 in FIG. 1 when the bezel assembly 102 is fully coupled to the blade system board 104 and the blade server chassis 106 in accordance with an exemplary embodiment of the present invention. FIG. 6 illustrates the positional relationship of the ejector tab 220, the latch 114, and the connectors 302 and 304. Specifically, FIG. 6 illustrates that the ejector tab 220 and the latch 114 align to facilitate contact when the latch 114 is actuated. Further, FIG. 6 clearly illustrates that the connectors 302 and 304 are positioned such that they do not interfere with actuation of the latch 114.

FIG. 7A, FIG. 7B, FIG. 7C, and FIG. 7D are a series of four plan views taken generally along line 7-7 in FIG. 6 that represent different stages in the process of coupling the bezel assembly 102 with the server assembly 107 in accordance with an exemplary embodiment of the present invention. Specifically, the four plan views in FIGS. 7A, 7B, 7C, and 7D illustrate the latch 114 in the process of receiving the retention flange 116 on the bezel assembly 102 and mating the bezel connector 302 with the system board connector 304 as components of the bezel assembly 102 are coupled to the other blade server components. The four plan views in FIGS. 7A, 7B, 7C, and 7D may be referred to as a first phase 602, a second phase 604, a third phase 606, and a fourth phase 608. Each of the phases represents a different position of the latch 114, retention flange 116, bezel connector 302, and system board connector 304, as the bezel assembly 102 is slid into a coupled configuration with the blade system board 104 and the blade server chassis 106. It should be noted that the mating of the bezel connector 302 and the system board connector 304 via the insertion of the bezel assembly 102 into the server assembly 107 facilitates tool-less assembly and avoids the need for a cable connection and access room for tools in the blade server 100.

The first phase 602 represents the position of the bezel assembly 102 and the server assembly 107 during coupling and before the retention flange 116 comes into contact with a sloped face 610 of the retention feature 508 of the bezel lock 502. It should be noted that, in the first phase 602, the bezel connector 302 and the system board connector 304 are not yet in contact. The second phase 604 represents positioning of the bezel assembly 102 and the server assembly 107 after the retention flange 116 has slid along a portion of the sloped face 610 and has biased the latch 114 into an open position, thus allowing the bezel assembly 102 to proceed into connection with the server assembly 107. It should be noted that, in the second phase 604, the guide pins 308 of the system board connector 304 are engaged within the guide receptacles 306 of the bezel connector 302. In the third phase 606, the retention flange 116 is about to slip past the sloped face 610 and into an opening 612 in the retention feature 508 of the bezel lock 502. In the third phase 606, the guide receptacles 306 have traveled along the guide pins 308, thus placing the bezel connector 302 and the system board connector 304 in alignment for mating. Finally, in the fourth phase 608, the bezel assembly 102 is coupled with the server assembly 107 to assemble the blade server 100. In the fourth phase 606, the retention flange 116 has slid past the sloped face 610 and the spring 504 has biased the retention feature 508 over the retention flange 116 such that it is retained within the opening 612. This generally blocks or prevents the bezel assembly 102 from decoupling from the server assembly 107 unless the latch 114 is actuated. It should also be noted that the bezel connector 302 and the system board connector 304 are mated in the fourth phase 606 and at least partially held in place by the latch 114 and the retention flange 116. The hand-screws 122 and the screw receptacles 124 may be coupled after the bezel assembly 102 is coupled with the server assembly 107 to further secure the coupling between the bezel assembly 102 and the server assembly 107.

FIG. 8A, FIG. 8B, FIG. 8C, and FIG. 8D are a series of four plan views taken generally along line 7-7 in FIG. 6 that represent different stages in the process of decoupling the bezel assembly 102 from the server assembly 107 in accordance with an exemplary embodiment of the present invention. Specifically, the four plan views in FIGS. 8A, 8B, 8C, and 8D illustrate the latch 114 in the process of ejecting the bezel assembly 102 and decoupling the bezel connector 302 from the system board connector 304 by biasing the ejector feature 510 of the bezel lock 502 against the ejector tab 220 that is coupled to the bezel assembly 102. The relationship of the ejector tab 220 to the bezel assembly 102 is clearly illustrated in FIG. 2. The four plan views in FIGS. 8A, 8B, 8C, and 8D may be referred to as a first phase 704, a second phase 706, a third phase 708, and a fourth phase 710. Each of the phases represents a different position of the latch 114, ejector tab 220, bezel connector 302, and system board connector 304, as the bezel assembly 102 is pushed out of a coupled configuration with the blade system board 104 and the blade server chassis 106 by actuation of the latch 114.

The first phase 704 represents the position of the bezel assembly 102 and the server assembly 107 in a coupled orientation. It should be noted that, in the first phase 704, the bezel connector 302 and the system board connector 304 are mated, and the retention feature 508 is disposed over the retention flange 116 such that it is retained within the opening 612. Further, it should be noted that the ejector tab 220 is arranged in front of the ejector feature 510 of the bezel lock 502. In the first phase, the hand-screws 122 and the screw receptacles 124 may be coupled to further secure the coupling between the bezel assembly 102 and the server assembly 107. Accordingly, the hand-screws 122 may have to be decoupled from the receptacles 124 to proceed with decoupling the bezel assembly 102 from the server assembly 107. The second phase 706 represents positioning of the bezel assembly 102 and the server assembly 107 after an initial actuation of the latch 114. Specifically, in the second phase 706, the ejector feature 510 of the bezel lock 502 in initially contacting the ejector tab 220. In the third phase 708, the ejector tab 220 has been biased toward an ejected configuration by the ejector feature 510 and the guide pins 308 are in the process of disengaging the guide receptacles 306. Finally, in the fourth phase 710, the bezel assembly 102 is substantially ejected from the server assembly 107. The biasing force supplied via the latch 114 has pushed the ejector tab 220, and thus the bezel assembly, 102 substantially away from the server assembly 107. Indeed, in the fourth phase 708, the guide pins 308 are outside of the guide receptacles 306, thus, the bezel connector 302 and the system board connector 304 are disengaged.

What is claimed is:

1. A blade server system comprising:
   a blade server system enclosure;
   a plurality of blade servers removably received within said blade server system enclosure, each of said plurality of blade servers comprising:
      a chassis;
      a system board coupled to the chassis, the system board comprising a first electrical connector;
      a bezel assembly removably coupled to the chassis and the system board, the bezel assembly comprising:
         a bezel face that is exposed on an outer surface of the blade server when the blade server is operational;
         a printed circuit assembly comprising a feature coupled to the bezel face; and
         a second electrical connector mounted on said printed circuit assembly;
         wherein the feature of the printed circuit board is visible through the bezel face when the blade server is operational;
      wherein, said second electrical connector is directly mated to the first electrical connector.

2. The system of claim 1, wherein the bezel assembly comprises a retention flange extending outwardly from a perimeter of the bezel assembly.

3. The system of claim 2, wherein the chassis comprises a latch removably coupled to the retention flange, the latch comprising a bezel lock configured to rotate about an alignment pin disposed through a hole in a central portion of the latch.

4. The system of claim 3, wherein the latch comprises a quick release hatch that is spring-loaded.

5. The system of claim 3, wherein the bezel lock comprises a retention feature on a first side of the hole and an ejector feature on a second side of the hole.

6. The system of claim 5, wherein the retention feature is disposed over the retention flange to retain the bezel assembly in a coupled position with respect to the chassis and the system board.

7. A blade server system comprising:
   a blade server system enclosure;

a plurality of blade servers removably received within said blade server system enclosure each of said plurality of blade servers comprising:
   a chassis;
   a system board coupled to the chassis, the system board comprising a first electrical connector;
   a bezel assembly removably coupled to the chassis and the system board, the bezel assembly comprising:
      a bezel body having an ejector tab extending from the bezel body;
      a printed circuit assembly and a second electrical connector mounted on said printed circuit assembly; and
      a retention flange extending outwardly from a perimeter of the bezel assembly
   wherein the chassis comprises a latch removably coupled to the retention flange, the latch comprising a bezel lock configured to rotate about an alignment pin disposed through a hole in a central portion of the latch;
   wherein the bezel lock comprises a retention feature on a first side of the hole and an elector feature on a second side of the hole; and
   wherein the ejector tab is aligned with a position that the ejector feature of the bezel lock is configured to rotate through; and
   wherein, said second electrical connector is directly mated to the first electrical connector.

8. The system of claim 3, wherein the first and second electrical connectors are blind mate connectors.

9. The system of claim 3, wherein the printed circuit assembly comprises circuitry for the feature being a status indicator.

10. The system of claim 9, wherein the status indicator comprises light emitting diodes.

11. The system of claim 1, wherein the printed circuit assembly comprises circuitry for the feature being a control feature.

12. The system of claim 1, wherein the bezel assembly comprises a spool receptacle disposed about a spool extending from the chassis.

13. The system of claims 1, wherein the bezel assembly is coupled to the chassis along a rail structure of the chassis.

14. A method comprising:
   inserting a bezel assembly into a server assembly by moving said bezel assembly in a first direction along a movement path relative to said server assembly;
   wherein, said bezel assembly comprises:
      a bezel face that is exposed on an outer surface of the server assembly when the server assembly is operational;
      a bezel printed circuit assembly comprising a feature, the bezel printed circuit assembly coupled to the bezel face;
      a bezel electrical connector mounted on said bezel printed circuit assembly; and
      a bezel flange;
      wherein the feature of the bezel printed circuit assembly is visible through the bezel face when the server assembly is operational and the bezel assembly is coupled to the server assembly
   wherein, said server assembly comprises:
      a chassis;
      a system board mounted on said chassis;
      a system board electrical connector in electrical communication with said system board; and
      a latch comprising a latch first end and an oppositely disposed latch second end, said latch being pivotally mounted on said chassis and being rotatable between a first position in which said latch first end is at least partially blocking said movement path and a second position in which said latch first end is not blocking said movement path;
   wherein said inserting said bezel assembly comprises:
      moving said bezel assembly a first distance along said movement path in said first direction, thereby causing an initial contact between said bezel flange and said latch first end;
      continuing movement of said bezel assembly in said first direction, after said initial contact between said bezel flange and said latch first end, thereby causing said latch to move from said first position to said second position; and
      continuing movement of said bezel assembly after said latch has reached said second position, thereby allowing said latch to return to said first position;
   wherein, after said inserting said bezel assembly, said bezel electrical connector is engaged with said system board electrical connector and said latch first end prevents movement of said bezel assembly in a second direction opposite said first direction.

15. The method of claim 14 and further wherein:
   said causing said latch first end comprises a sloped face; and
   said latch first end to move from said first position to said second position comprises forcing said bezel flange against said sloped face.

16. The method of claim 14 and further wherein:
   said latch is biased toward said first position;
   said causing said latch first end to move from said first position to said second position comprises causing said latch first end to move from said first position to said second position against said bias; and
   said allowing said latch first end to return to said first position comprises allowing said latch first end to return to said first position due to said bias.

17. The method of claim 16 and further wherein said latch is biased toward said first position by a spring.

18. A method comprising:
   inserting a bezel assembly into a server assembly by moving said bezel assembly in a first direction along a movement path relative to said server assembly;
   wherein, said bezel assembly comprises:
      a bezel printed circuit assembly;
      a bezel electrical connector mounted on said bezel printed circuit assembly; and
      a bezel flange;
   wherein, said server assembly comprises:
      a chassis;
      a system board mounted on said chassis;
      a system board electrical connector in electrical communication with said system board; and
      a latch comprising a latch first end and an oppositely disposed latch second end, said latch being pivotally mounted on said chassis and being rotatable between a first position in which said latch first end is at least partially blocking said movement path and a second position in which said latch first end is not blocking said movement path;
   wherein said inserting said bezel assembly comprises:
      moving said bezel assembly a first distance along said movement path in said first direction, thereby causing an initial contact between said bezel flange and said latch first end;

continuing movement of said bezel assembly in said first direction, after said initial contact between said bezel flange and said latch first end, thereby causing said latch to move from said first position to said second position; and continuing movement of said bezel assembly after said latch has reached said second position, thereby allowing said latch to return to said first position;

wherein, after said inserting said bezel assembly, said bezel electrical connector is engaged with said system board electrical connector and said latch first end prevents movement of said bezel assembly in a second direction opposite said first direction;

removing said bezel assembly from said server assembly by moving said bezel assembly in said second direction along with movement path;

wherein, said bezel assembly further comprises a bezel ejector tab extending therefrom;

wherein said removing said bezel assembly comprises;

moving said latch from said first position toward said second position, thereby causing an initial contact between said latch second end and said bezel ejector tab;

continuing movement of said latch toward said second position;

after said initial contact between said latch second end and said bezel ejector tab, thereby causing said bezel assembly to begin moving in said second direction along said movement path and said bezel electrical connector to begin disengaging from said system board electrical connector.

19. A system comprising:
a bezel assembly that is removably insertable into a server assembly by moving said bezel assembly in a first direction along a movement path relative to said server assembly;
said bezel assembly comprising:
  a bezel face that is exposed on an outer surface of the server assembly when the server assembly is operational;
  a bezel printed circuit assembly comprising a feature, the bezel printed circuit assembly coupled to the bezel face;
  a bezel electrical connector mounted on said bezel printed circuit assembly; and
  a bezel flange;
  wherein the feature of the bezel printed circuit assembly is visible through the bezel face when the server assembly is operational and the bezel assembly is coupled to the server assembly;
said server assembly comprising:
  a chassis;
  a system board mounted on said chassis;
  a system board electrical connector in electrical communication with said system board; and
  a latch comprising a latch first end and an oppositely disposed latch second end, said latch being pivotally mounted on said chassis and being rotatable between a first position in which said latch first end is at least partially blocking said movement path and a second position in which said latch first end is not blocking said movement path;
wherein said system is capable of assuming the following conditions when said bezel assembly is being inserted into said server assembly;
  a first condition in which said latch first end is in said first position and said latch first end is not in contact with said bezel flange;
  a second condition in which said bezel assembly has moved a first distance along said movement path in said first direction, contact is established between said bezel flange and said latch first end and said latch has moved from said first position to said second position;
  a third condition in which said bezel assembly has moved a second distance along said movement path in said first direction, said second distance being greater than said first distance, said bezel electrical connector is engaged with said system board electrical connector, said latch has returned to said first position and said latch first end prevents movement of said bezel assembly in a second direction opposite said first direction.

20. The system of claim 19 and wherein said latch first end comprises a sloped face.

21. The system of claim 19 and further wherein said latch is biased toward said first position.

22. The system of claim 21 and further wherein said latch is biased toward said first position by a spring.

23. A system comprising:
a bezel assembly that is removably insertable into a server assembly by moving said bezel assembly in a first direction along a movement path relative to said server assembly:
said bezel assembly comprising:
  a bezel printed circuit assembly
  a bezel electrical connector mounted on said bezel printed circuit assembly: and
  a bezel flange;
said server assembly comprising:
  a chassis:
  a system board mounted on said chassis
  a system board electrical connector in electrical communication with said system board; and
  a latch comprising a latch first end and an oppositely disposed latch second end, said latch being pivotally mounted on said chassis and being rotatable between a first position in which said latch first end is at least partially blocking said movement path and a second position in which said latch first end is not blocking said movement path;
wherein said system is capable of assuming the following conditions when said bezel assembly is being inserted into said server assembly;
  a first condition in which said latch first end is in said first position and said latch first end is not in contact with said bezel flange;
  a second condition in which said bezel assembly has moved a first distance along said movement path in said first direction, contact is established between said bezel flange and said latch first end and said latch has moved from said first position to said second position;
  a third condition in which said bezel assembly has moved a second distance along said movement path in said first direction, said second distance being greater than said first distance, said bezel electrical connector is engaged with said system board electrical connector, said latch has returned to said first position and said latch first end prevents movement of said bezel assembly in a second direction opposite said first direction;

said bezel assembly is removable from said server assembly by moving said bezel assembly in said second direction along said movement path;
said bezel assembly further comprises a bezel ejector tab extending therefrom:
wherein said system is capable of assuming the following conditions when said bezel assembly is being removed from said server assembly:
   a fourth condition in which said latch has moved from said first position toward said second position, thereby causing an initial contact between said latch second end and said bezel ejector tab;
   a fifth condition in which said latch has moved further toward said second position, after said initial contact between said latch second end and said bezel ejector tab, thereby causing said bezel assembly to begin moving in said second direction along said movement path and said bezel electrical connector to begin disengaging from said system board electrical connector.

24. The system of claim 1 further comprising:
the printed circuit assembly defines a first plane; and
the system board defines a second plane parallel to the first plane;
wherein the first plane and second plane are parallel to a direction of travel when the first electrical connector is being coupled to the second electrical connector.

25. The method of claim 14 wherein said bezel assembly further comprising:
the bezel printed circuit assembly defines a first plane parallel to a plane defined by the system board of the server assembly;
wherein the first plane and second plane are parallel to a direction of travel when the bezel electrical connector is being coupled to the system board electrical connector.

26. The system of claim 19 further comprising:
the printed circuit assembly defines a first plane; and
the system board defines a second plane parallel to the first plane;
wherein the first plane and second plane are parallel to a direction of travel when the bezel electrical connector is being coupled to the system board electrical connector.

* * * * *

UNITED STATES PATENT AND TRADEMARK OFFICE
CERTIFICATE OF CORRECTION

PATENT NO. : 8,649,180 B2  
APPLICATION NO. : 11/656170  
DATED : February 11, 2014  
INVENTOR(S) : John R. Grady et al.

Page 1 of 1

It is certified that error appears in the above-identified patent and that said Letters Patent is hereby corrected as shown below:

In the Claims:

In column 8, line 58, in Claim 4, delete "hatch" and insert -- latch --, therefor.

In column 9, line 2, in Claim 7, delete "enclosure" and insert -- enclosure, --, therefor.

In column 9, line 22, in Claim 7, delete "elector" and insert -- ejector --, therefor.

In column 9, line 60, in Claim 14, delete "assembly" and insert -- assembly; --, therefor.

In column 10, line 26, in Claim 15, after "said" delete "causing said".

In column 10, line 28, in Claim 15, after "said" insert -- causing said --.

In column 12, line 19, in Claim 20, after "and" insert -- further --.

In column 12, line 29, in Claim 23, delete "assembly:" and insert -- assembly; --, therefor.

In column 12, line 34, in Claim 23, delete "assembly:" and insert -- assembly; --, therefor.

In column 12, line 37, in Claim 23, delete "chassis:" and insert -- chassis; --, therefor.

In column 12, line 38, in Claim 23, delete "chassis" and insert -- chassis; --, therefor.

Signed and Sealed this  
Twenty-fifth Day of November, 2014

Michelle K. Lee  
*Deputy Director of the United States Patent and Trademark Office*